(12) United States Patent
Bennett

(10) Patent No.: US 10,023,020 B2
(45) Date of Patent: Jul. 17, 2018

(54) LOOK AHEAD VEHICLE SUSPENSION SYSTEM

(71) Applicant: Enpulz, LLC, Austin, TX (US)

(72) Inventor: James D. Bennett, Hroznetin (CZ)

(73) Assignee: Enpulz, LLC, Austin, TX (US)

( * ) Notice: Subject to any disclaimer, the term of this patent is extended or adjusted under 35 U.S.C. 154(b) by 0 days.

(21) Appl. No.: 15/378,489

(22) Filed: Dec. 14, 2016

(65) Prior Publication Data

US 2017/0087952 A1    Mar. 30, 2017

Related U.S. Application Data

(63) Continuation of application No. 14/467,193, filed on Aug. 25, 2014, now Pat. No. 9,527,363, which is a continuation of application No. 13/647,164, filed on Oct. 8, 2012, now Pat. No. 8,818,629, which is a
(Continued)

(51) Int. Cl.
| | |
|---|---|
| *B60G 17/0165* | (2006.01) |
| *B60G 17/0195* | (2006.01) |
| *B60G 17/08* | (2006.01) |
| *B60G 17/019* | (2006.01) |

(52) U.S. Cl.
CPC ....... *B60G 17/0165* (2013.01); *B60G 17/019* (2013.01); *B60G 17/0195* (2013.01); *B60G 17/01908* (2013.01); *B60G 17/01933* (2013.01); *B60G 17/08* (2013.01); *B60G 2400/821* (2013.01); *B60G 2400/823* (2013.01); *B60G 2800/91* (2013.01); *B60G 2800/92* (2013.01); *B60G 2800/925* (2013.01); *B60G 2800/96* (2013.01); *B60G 2800/982* (2013.01)

(58) Field of Classification Search
CPC .............. B60G 17/0165; B60G 17/019; B60G 17/01908; B60G 17/01933; B60G 17/0195; B60G 17/08; B60G 2400/821; B60G 2400/823; B60G 2800/91; B60G 2800/92; B60G 2800/925; B60G 2800/96; B60G 2800/982
USPC ......................................................... 701/37
See application file for complete search history.

(56) References Cited

U.S. PATENT DOCUMENTS

| | | | | |
|---|---|---|---|---|
| 4,804,203 A | * | 2/1989 | Glab | B60G 17/019 280/5.514 |
| 5,346,242 A | * | 9/1994 | Karnopp | B60G 17/018 280/5.514 |

(Continued)

FOREIGN PATENT DOCUMENTS

| | | | | |
|---|---|---|---|---|
| EP | 0001009 A1 | * | 3/1979 | ............... B60G 3/26 |
| EP | 0465849 A2 | * | 1/1992 | ......... B60G 17/0165 |

(Continued)

*Primary Examiner* — Tuan C To

(57) ABSTRACT

An active suspension system senses roadway defects and adjusts an active and controllable suspension system of the vehicle before tires come in contact with the defect. The active suspension system identifies a type of defect or debris, e.g., pothole, bump, object, etc., along with the size, width, depth, and/or height information of the defect to more accurately control operation of the suspension system to prepare for, or avoid contact with the roadway defects and obstacles. Imaging techniques are employed to identify the defect or debris. Operation of a serviced cruise control system is controlled to enhance passenger safety and comfort.

20 Claims, 10 Drawing Sheets

Related U.S. Application Data continuation of application No. 11/725,739, filed on Mar. 20, 2007, now Pat. No. 8,285,447.

(56) References Cited

U.S. PATENT DOCUMENTS

| | | | |
|---|---|---|---|
| 5,521,594 A * | 5/1996 | Fukushima | B60G 17/0165 180/167 |
| 5,979,885 A * | 11/1999 | Katsuda | B60G 17/0165 188/266.1 |
| 6,164,665 A * | 12/2000 | Lentz | B60G 17/015 280/124.157 |
| 6,279,920 B1 * | 8/2001 | Choudhery | B60G 3/26 280/5.5 |
| 6,498,967 B1 * | 12/2002 | Hopkins | B60C 23/0408 340/442 |
| 7,380,800 B2 * | 6/2008 | Klees | B60G 17/0165 280/5.515 |
| 2001/0030400 A1 * | 10/2001 | Zetterstrom | B60G 3/20 280/5.51 |
| 2006/0074540 A1 * | 4/2006 | Braunberger | B60Q 1/447 701/70 |
| 2006/0251293 A1 * | 11/2006 | Piirainen | B60N 2/002 382/104 |
| 2007/0073944 A1 * | 3/2007 | Gormley | B60R 16/0231 710/72 |
| 2008/0147277 A1 * | 6/2008 | Lu | B60W 30/085 701/45 |
| 2012/0296567 A1 * | 11/2012 | Breed | G01C 21/26 701/468 |

FOREIGN PATENT DOCUMENTS

| | | | |
|---|---|---|---|
| JP | 3769410 | B2 * | 4/2006 |
| KR | 100398184 | B1 * | 9/2003 |

* cited by examiner

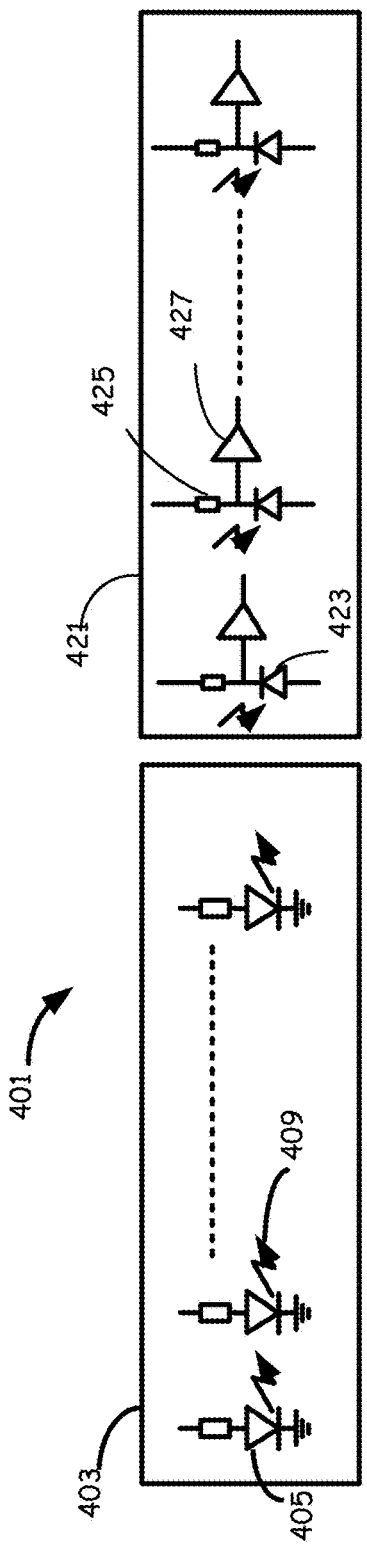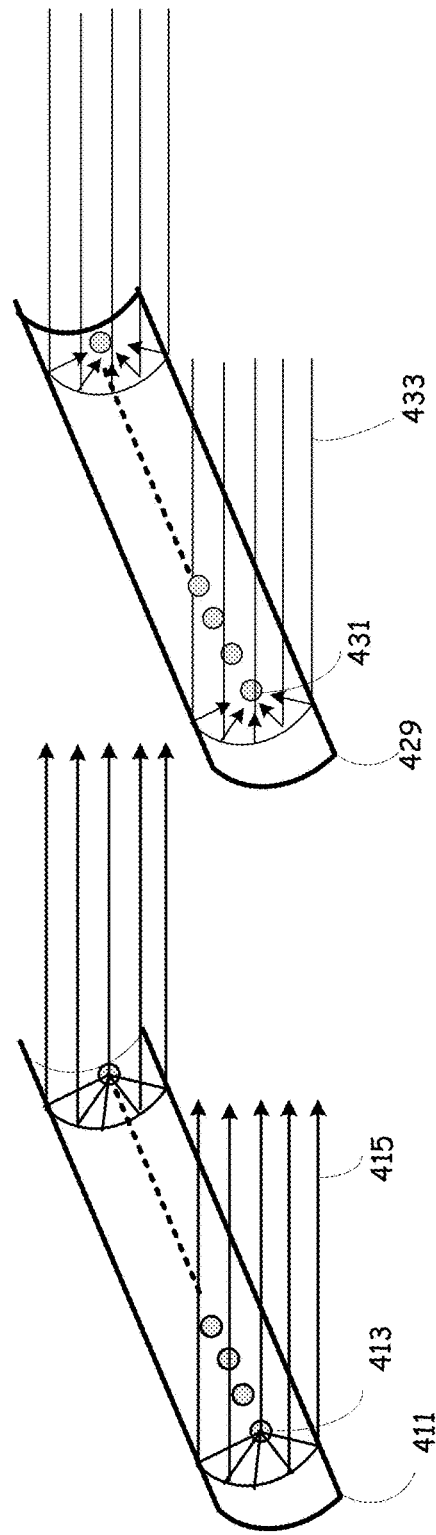
Fig. 4a
Fig. 4b
Fig. 4c
Fig. 4d

LOOK AHEAD VEHICLE SUSPENSION SYSTEM

CROSS REFERENCE TO PRIORITY APPLICATION

The present U.S. Utility patent application claims priority pursuant to 35 U.S.C. § 120 as a continuation of U.S. Utility application Ser. No. 14/467,193, entitled "Look Ahead Vehicle Suspension System," filed Aug. 25, 2014, issuing as U.S. Pat. No. 9,527,363, which is a continuation of U.S. Utility application Ser. No. 13/647,164, entitled "Look Ahead Vehicle Suspension System," filed Oct. 8, 2012, now U.S. Pat. No. 8,818,629, which is a continuation of U.S. Utility application Ser. No. 11/725,739, entitled "Look Ahead Vehicle Suspension System," filed Mar. 20, 2007, now U.S. Pat. No. 8,285,447, all of which are hereby incorporated herein by reference in their entirety and made part of the present U.S. Utility patent application for all purposes.

FIELD OF THE INVENTION

This invention relates to automobiles and, more particularly, to suspension systems used in automobiles.

BACKGROUND OF THE INVENTION

Automobile (vehicle) suspension systems are generally known. An automobile suspension system isolates to some degree the tires and wheels of the automobile from the occupant-carrying body (vehicle cabin) of the automobile. Passive automobile suspension systems react when the surface upon which the automobile is traveling changes over distance and time. For example, when the tires of the automobile come in physical contact with [J1]a bump as the automobile travels over the bump, the suspension system reacts to partially isolate the relative motion of the tires from the body to minimize the impact upon the occupants of the vehicle. Likewise, when a tire passes over a pothole in the road, the tire drops into the pothole and the suspension system operates to isolate this relative motion of the tire from the body to minimize impact on the occupants.

As automotive technology has advanced, so has the technology of automobile suspension systems. Initially, automobile suspension systems included leaf springs that absorbed only the vertical motion of the times. However, these springs caused the body to oscillate with respect to the tires. In order to dampen this oscillation, "shocks" were added to the suspension, which helped to dampen the oscillations caused by the springs. Further, because it was disadvantageous for the motion of wheels to be coupled to one another via the suspension system, independent suspension systems were developed that allowed each tire/wheel to move independently from each other tire/wheel. Other improvements introduced variable dampening of the suspension systems. With more stiff suspension settings, the suspension system caused the vehicle to perform better, particularly when cornering. With less stiff suspension settings, the suspension system provided a smoother ride to the occupants. In some applications, the stiffness of the suspension system was controllable by the driver.

Each of these prior suspension systems has the distinct disadvantage of being reactive to the motion of the tires/wheels with respect to the body. Such reactive behavior of the prior automobile suspension systems fully limited the performance that these suspension systems could achieve.

Further limitations and disadvantages of conventional and traditional approaches will become apparent to one of ordinary skill in the art through comparison of such systems with the present inventions as set forth in the remainder of the present application with reference to the drawings.

BRIEF SUMMARY OF THE INVENTION

Various aspects of the present invention are found in an active vehicle suspension system of the present invention. The active vehicle suspension system of the present invention senses an appearing roadway hazard and actively alters the behavior of its suspension system in preparation of an expected meeting with the road hazard. The active vehicle suspension system control therefore prepares the suspension system to effectively mitigate meeting of tires of the vehicle with the road hazard to cause the suspension system to absorb much of the shock caused by the meeting and the oscillations of the body (vehicle cabin) that the meeting would otherwise cause to provide improved safety and comfort to the people inside the cabin.

Embodiments of present invention provide active cruise control operation to provide better sensing capability of roadway conditions so as to enhance the safety of the cruise operation. The roadway hazards sensing operations of the present invention intercouple with the cruise control system to automatically override cruise control settings, alter the drive override cruise control settings, and also cause the automobile to actively brake in preparation for impact with the road hazard.

Some embodiments of the present invention provide multilevel decision making capability for a vehicular "sense and control mechanism" for the identification of each type of the roadway defects based on their width, depth, and height, which requires multilevel control (signal) for hazard mitigation, in a smooth manner, through a smoother adjustment of suspension fluid pressure for a jerk free cruise of vehicle over the roadway.

Further aspects of the present invention are found in a safe cruising of the vehicle over hostile roadway conditions, with the associated mechanisms for aiding the driver with adequate audio/visual indication, along with the necessary override control in the event of any human error or in the situation of driving beyond the safe limit of speed.

Other features and advantages of the present invention will become apparent from the following detailed description of the invention made with reference to the accompanying drawings.

BRIEF DESCRIPTION OF THE DRAWINGS

FIGS. 4a-4d are diagrams illustrating various types of transceivers used for detecting roadway defects and hazards used with various embodiments of the present invention;

DETAILED DESCRIPTION

Figure 1:
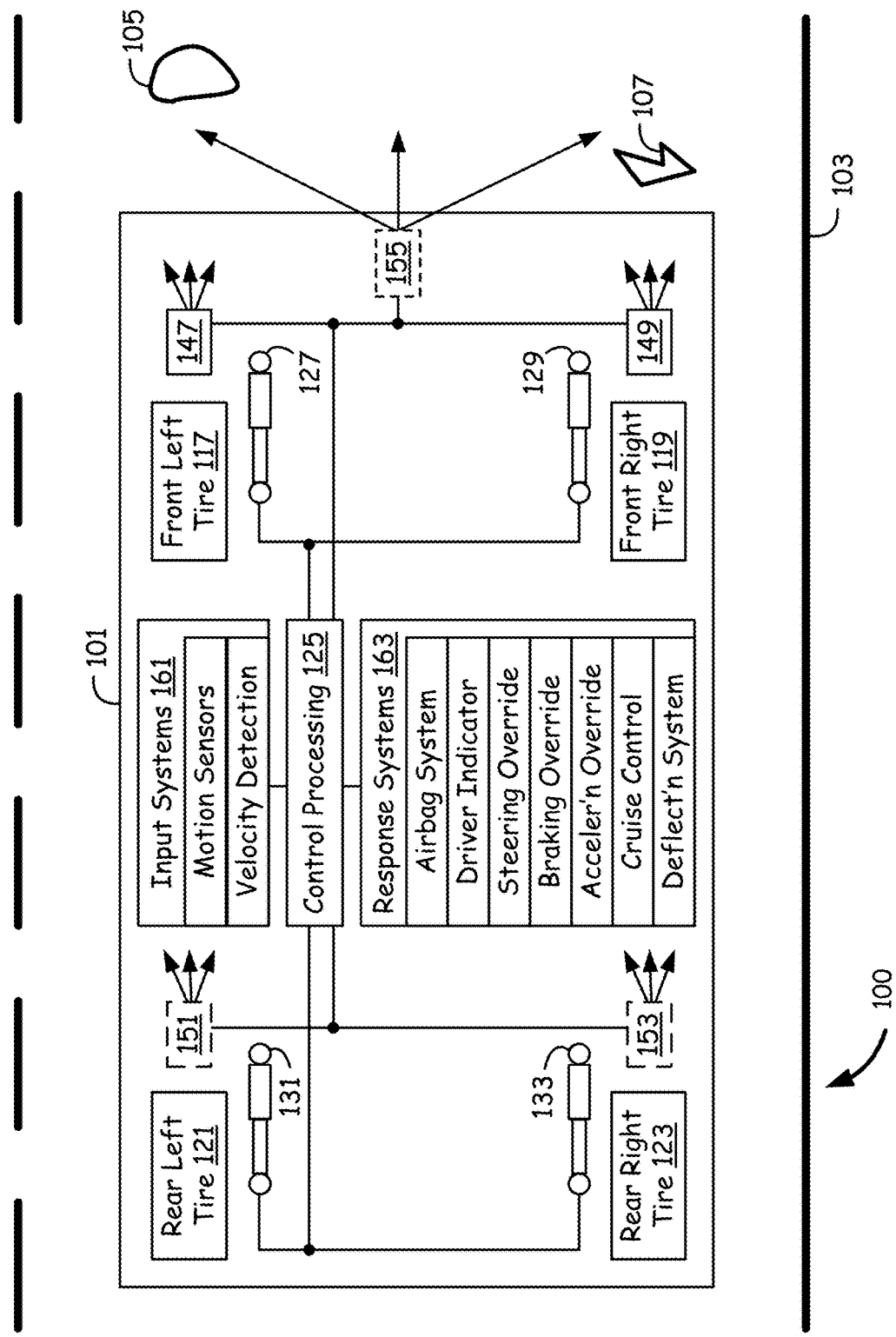
FIG. 1 is a diagram illustrating an active suspension control system of the present invention as applied to for a four wheeled vehicle, with sensor assemblies mounted at strategic points on the chassis of the vehicle for a maximum surveillance of roadway hazards and defects along with various inputs through their interfaces, and response variables in an electrical form to controlling processing circuitry.

FIG. 1 is a traffic system 100, comprising a four wheeler vehicle 101 on a roadway 103, which has deployed the look ahead suspension technique, having a capability to visualize roadway defects such as potholes and bumps, 105, and obstacle 107 well ahead in anticipation, which can cause undesirable shocks and oscillations to the vehicle and hence discomforting people inside it. The suspension adjustment is done before vehicle physically coming in contact with the defects, to mitigate their effects.

The front left tire assembly 117, is associated with a transceiver detector assembly 147, and further associated with an adjustable suspension 127. The transceiver 147 can transmit electromagnetic waves, according to an embodiment of the present invention, towards the roadway and receives the reflected wave, which is characterized by the roadway characteristics.

The front right tire assembly 119, is associated with a transceiver detector assembly 149, and further associated with an adjustable suspension 129. The transceiver 149 can transmit electromagnetic waves, according to an embodiment of the present invention, towards the roadway and receives the reflected wave, which is characterized by the roadway characteristics.

The rear left tire assembly 121, is associated with a transceiver detector assembly 151, and further associated with an adjustable suspension 131. The transceiver 151 can transmit electromagnetic waves, according to an embodiment of the present invention, towards the roadway and receives the reflected wave, which is characterized by the roadway characteristics.

The rear right tire assembly 123, is associated with a transceiver detector assembly 153, and further associated with an adjustable suspension 133. The transceiver 153 can transmit electromagnetic waves, according to an embodiment of the present invention, towards the roadway and receives the reflected wave, which is characterized by the roadway characteristics.

FIG. 1 is a diagram illustrating an active suspension control system of the present invention as applied to for a four wheeled vehicle, with sensor assemblies mounted at strategic points on the chassis of the vehicle for a maximum surveillance of roadway hazards and defects along with various inputs through their interfaces, and response variables in an electrical form to controlling processing circuitry. In an embodiment according to the present invention, receivers transceiver 147, 149, 151, and 153 convert reflected light from the roadway to a proportional electric signal and apply this signal to the control processing unit 125, which in turn controls the adjustable suspensions elements, 147, 149, 151, and 153, before the wheels of the vehicle come in physical contact with the roadway defects 105 and 107.

The control processing unit 125 is associated with input system 161, which has measured information related to a cruise control, such as motion sensor output, velocity detector output, etc., which leads to decision making with respect to the thresholds that manually set variables and finally actuating a response system, 163.

The control processing unit 125 and Input system 161 are also associated with a Response system 163, which responds based upon the decision made with respect the manually set variables and finally actuating safety devices such as a Airbag system, Driver indicator, Steering override, Braking override, Acceleration override, Cruise control, and Deflection system.

Figure 2:
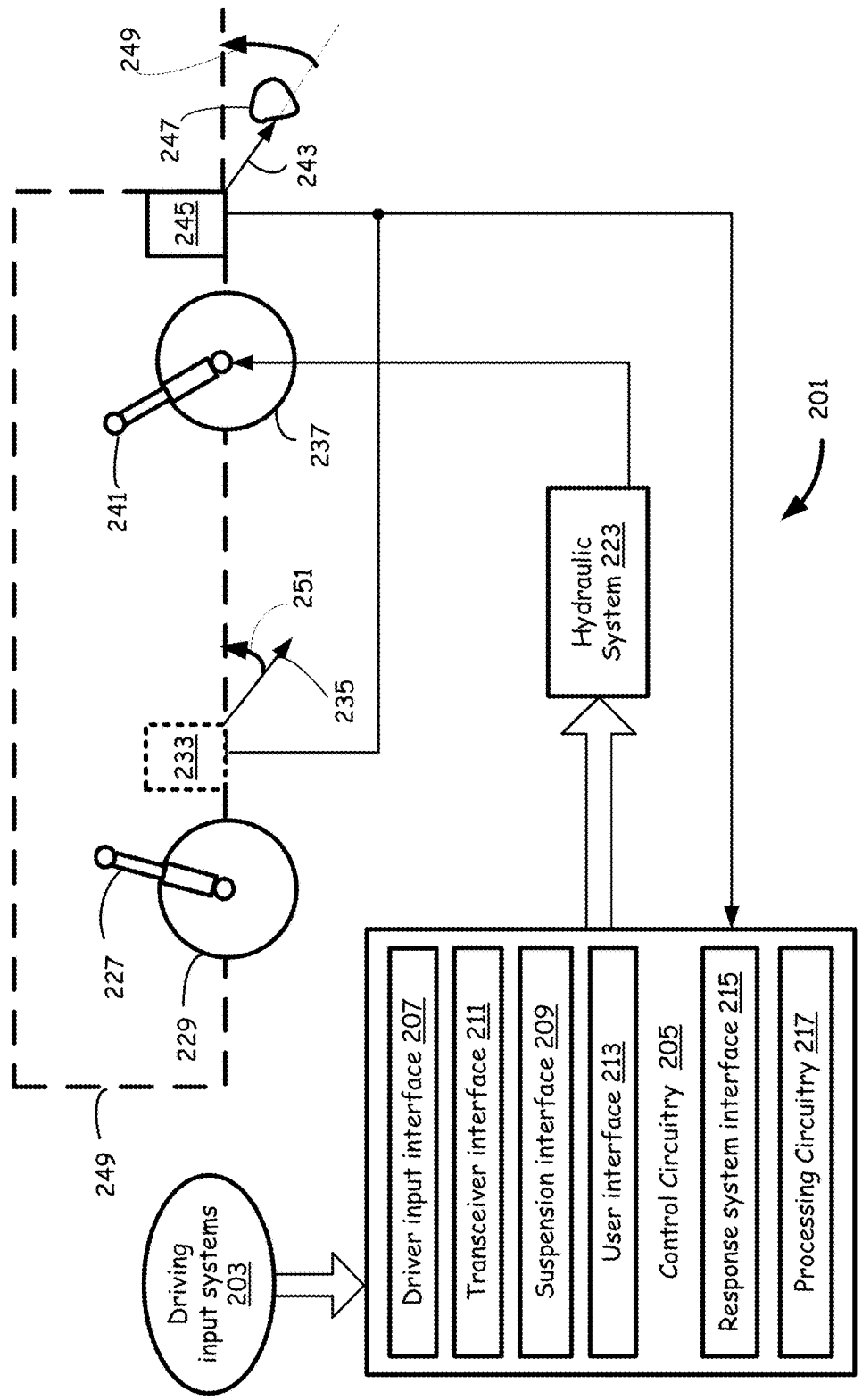
FIG. 2 is a diagrammatic side schematic view of embodiments of the present invention that may be incorporated with a two wheeled vehicle or a four wheeled vehicle, for example.

FIG. 2 is a diagrammatic side schematic view of embodiments of the present invention that may be incorporated with a two wheeled vehicle or a four wheeled vehicle, for example. Various sensing and detecting mechanisms aboard in 201 and each one of them have separate interface with the central process and control circuitry. The suspension control part is emphasized with the brief description of the hydraulic system.

In an embodiment according to the present invention, 249 can be any class of vehicle; a two wheeler, a car, a truck, etc., with front tire assembly 237 associated, with its controllable suspension 241, and (transceiver) detector 245. The detector sends signal 243 toward the roadway at an angle 249 for detecting the roadway defect 247 toward which the front wheels of the vehicle are approaching in a short period of time; receives the reflected signal, and sends it to transceiver interface 211 of the control circuitry 205.

In an embodiment according to the present invention, 249 can be any class of vehicle; a two wheeler, a car, a truck, etc., with rear tire assembly 229 associated, with its controllable suspension 227, and (transceiver) detector 233. The detector sends signal 235 toward the roadway at an angle 251 for detecting the roadway defect 247 toward which the rear wheels of the vehicle are approaching in a short period of time; receives the reflected signal, and sends it to transceiver interface 211 of the control circuitry 205.

In an embodiment according to the present invention, the suspension interface 209 processes the incoming reflected roadway signal sends it to the processing circuitry 217, generates the necessary control signal through the response system interface 215 and suspension interface 209, which goes to hydraulic system 223, further controlling the suspension 227 and 241.

In an embodiment according to the present invention, the driving input system 203 also generates various signal inputs 249, can be any class of vehicle; a two wheeler, a car, a truck, etc., with front tire assembly 237 associated, with its controllable suspension 241, and (transceiver) detector 245. The detector sends signal 243 toward the roadway at an angle 249, indicated for detecting the roadway defect 247 toward which the front wheels of the vehicle are approaching in a short period of time; receives the reflected signal, and sends it to suspension interface 209 of the control circuitry 205.

In an embodiment according to the present invention, the driving input system 203 also generates various signal inputs 249, can be any class of vehicle; a two wheeler, a car, a truck, etc., with rear tire assembly 229 associated, with its controllable suspension 221, and (transceiver) detector 233. The detector sends signal 235 toward the roadway at an angle 251, indicated for detecting the roadway defect 247 toward which the rear wheels of the vehicle are approaching in a short period of time; receives the reflected signal, and sends it to suspension interface 209 of the control circuitry 205.

Figure 3:
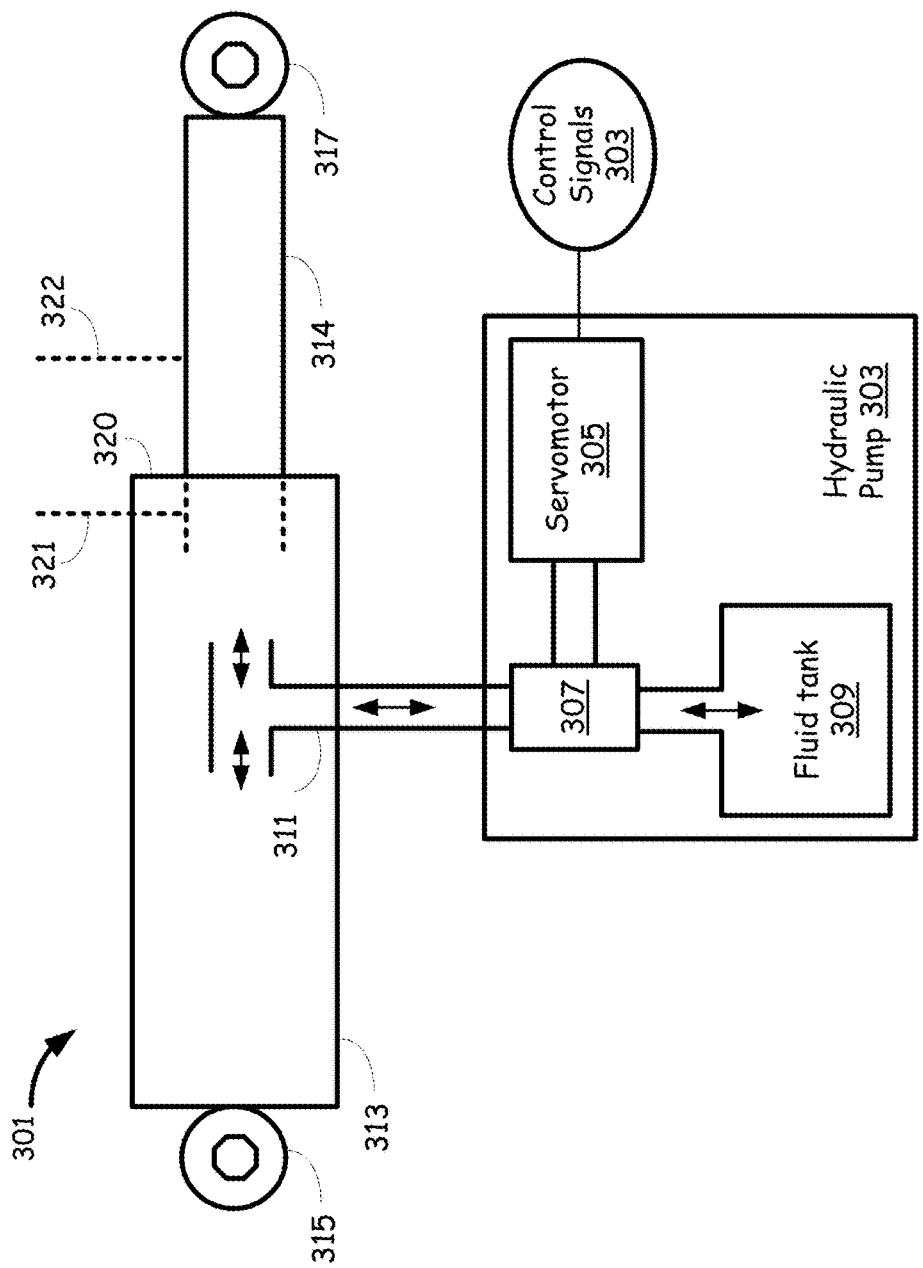
FIG. 3 is a diagram illustrating a hydraulic pressure control suspension system acting in response to the roadway conditions sensed by a transceiver and controlled by control circuitry according to various aspects of the present invention.

FIG. 3 is a diagram illustrating a hydraulic pressure control suspension system acting in response to the roadway conditions sensed by a transceiver and controlled by control circuitry according to various aspects of the present invention. The system 301 includes a hydraulic actuated structure to provide the controllable suspension 227 and 241 of FIG. 2. The system 301 adjusts fluid pressure inside cylinder 313 of the suspension 301 using a Hydraulic pump 303. The cylinder 313 is mounted on the vehicle chassis using the fixtures 315 and 317 with its internal pressure adjusted in response to the roadway conditions. Moving cylinder 314 moves with respect to cylinder 313 and based with its position and ability to move with cylinder based upon the amount of hydraulic fluid within cylinder 313. The cylinder 313 and moving cylinder 314 are constructed so that the range of motion of the moving cylinder 314 is limited with respect to the cylinder 313. For example, the moving cylinder 314 may be limited in its relative motion with respect to the cylinder such that positions 321 and 322 on the moving cylinder 314 define a range of motion with respect to the edge 320 of cylinder 313.

In an embodiment according to the present invention, the hydraulic pump 303 is used to react in response to the control signal 303, generated from the control circuitry 205 of FIG. 2. The control signal 303 drives a servomotor 305, coupled to a pump 307 that is operable to pump hydraulic fluid from the Fluid tank 309 into and out of the cylinder 313 of the suspension 313.

In an embodiment according to the present invention, the fluid pressure remains normal under normal roadway conditions. When the vehicle wheels encounter a pothole, fluid pressure is increased and when the vehicle wheels encounter a bump the fluid pressure is decreased.

FIGS. 4a-4d are diagrams illustrating various types of transceivers used for detecting roadway defects and hazards used with various embodiments of the present invention. FIG. 4a is a 1D (one dimensional) array of LEDs used for sending optical signal focused using a reflector towards roadway as shown in FIG. 4b. FIG. 4c is one of the several types of receivers used for sensing the reflected electromagnetic signal (in the form of light) from the roadway. For better receiver efficiency, the low intensity reflected light from the roadway obstacle, is made to incident on a reflector similar to that of FIG. 4b which helps in capturing more light on to a 1D array of photo diodes or photo transistors as shown in FIG. 4d. In FIG. 1a, a 1D array of LEDs 403 acts as a source of light focused at an angle towards the roadway defects. The 1D array of LEDs is placed at the focal point of a reflector as shown in FIG. 4b to send an optimum intensity of light toward the roadway, with parallel rays. Similarly a reflector can also be used to capture more light by placing the array of photodiodes (PDs) at the focal point of the reflector as shown in FIG. 4c.

In an embodiment according to the present invention, in FIG. 4a, an array, 403, comprising a plurality of LEDs 405, acts as a source light signal 409, which will emitted in all direction, causing the light intensity to fall rapidly even in a small distance from the source. This requires a type of the reflector 411, as shown in FIG. 4b, to focus light in one direction.

In an embodiment according to the present invention, in FIG. 4b, a 1D array of LEDs 413 is located in the focal point of a reflector 411 for making the light, parallel and more focused ray, 415. By rotating the reflector 411 over the axis of the 1D array of LEDs 413, it is possible to change the direction of the light beam.

In an embodiment according to the present invention, the reflected light from the roadway defects 247, in FIG. 2 is converted into electrical signal, by a PD 423 and amplified by an amplifier 427 as shown in FIG. 4c. An array of PDs, 421 in this figure can also be used in the place of single PD, wherein the electrical signal from each of these PDs can be summed to get a better result for effective detection of the roadway defects, increasing the capture area for the reflected light from the roadway.

In an embodiment according to the present invention, 1D array of PDs can be mounted at the focal point of a reflector 429 as shown in FIG. 4d for capturing maximum reflected light, according to one embodiment of the present invention. The reflected light from the roadway defects 247, in FIG. 2 will converge at the focal point of the reflector 429 to enhance conversion efficiency of the detector and hence the sensitivity. This reflected light signal is a measure of the defect, their type (pothole or a bump) and size.

Figure 5:
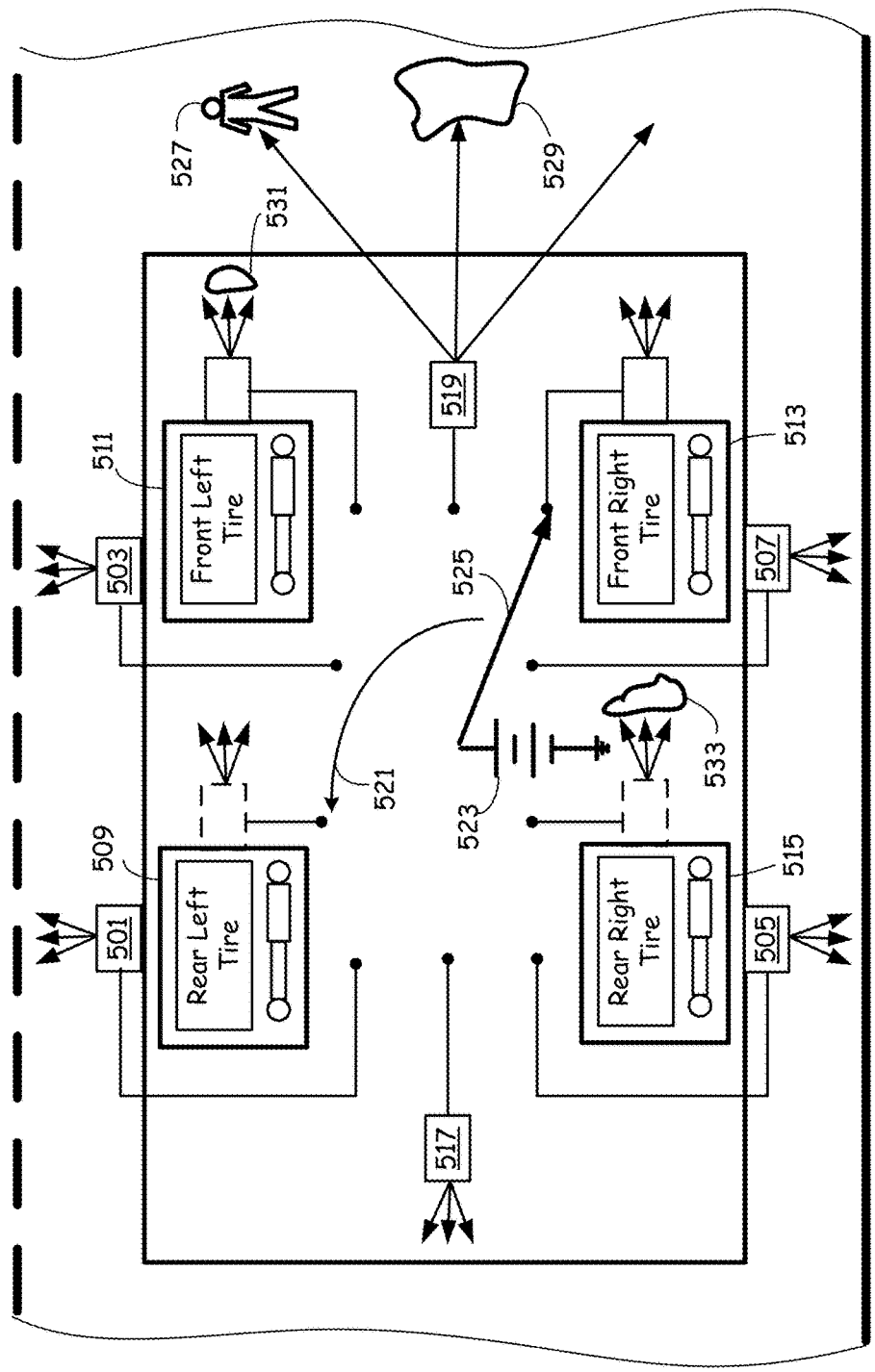
FIG. 5 is a diagram illustrating the positioning of several detectors onboard a vehicle chassis along with one method of scanning roadway characteristics on a time-shared basis according to one or more embodiments of the present invention.

FIG. 5 is a diagram illustrating the positioning of several detectors onboard a vehicle chassis along with one method of scanning roadway characteristics on a time-shared basis according to one or more embodiments of the present invention. For example, FIG. 5 illustrates a detector assembly placed on the vehicle chassis for roadway defect detection and look ahead suspension control, velocity measurement, acceleration measurement, cruise control, collision control, and roadway obstacle sensing. Further, FIG. 5 also illustrates the manner in which the values of these desired variables are sensed and fed into a process and control circuit for actuating a response system. A simple scanning mechanism gathers data on these variables in a timeshared manner with a period of the scanning cycle, in the order of microsecond or less, which allows a comfortable scanning of the roadway conditions and other parameters of vehicle driving information, when the vehicle is moving at its maximum speed limit.

In an embodiment of the present invention, the roadway defect detector assembly and a controllable suspension device are associated with the Rear left tire assembly 509, Front left tire assembly 511, Front right tire assembly 513, and Rear right tire assembly 515. Each of the roadway defect detector controls the respective suspension device, independent of each other, against the roadway defects 531, and 533.

In an embodiment according to the present invention, detector 519 mounted on the front part of the chassis and detector 517 mounted on the rear part of the chassis can sense larger roadway obstacles, both living 527, and non-living 529. Each of these sensors sense obstacles and generate control signal to actuate, the indication to driver and the override mechanisms. They also trigger airbag mechanism under high impact or sudden braking conditions.

In an embodiment according to the present invention, the detectors 501, 503, 505, and 507 mounted on the left and right side of the vehicle chassis can detect the passing vehicles in left and right sides respectively in a parallel or an anti-parallel direction. If these vehicles come closer to this vehicle, an audio/visual indication is given to the driver for a safety action from safe distance.

In an embodiment according to the present invention, these detectors 501, 503, 505, 507, 517, and 519, which are either point sources or an array of the detecting elements, as described in FIG. 4, are scanned by a high speed switch to energize these detectors by a battery 523, at discrete interval of time. The scanning mechanism is a high speed switch indicated as a wiper 525, swept in the direction 521, coming in contact with each of the detector terminal for an extremely short time. During the same time the signal is processed and the control signal is generated by the processing and control circuitry, and applied to the respective devices, such as cruise control, suspension control, overriding control, airbag control etc. Of course, the scanning may also be done via electrical control that is electronically switched.

Figure 6:
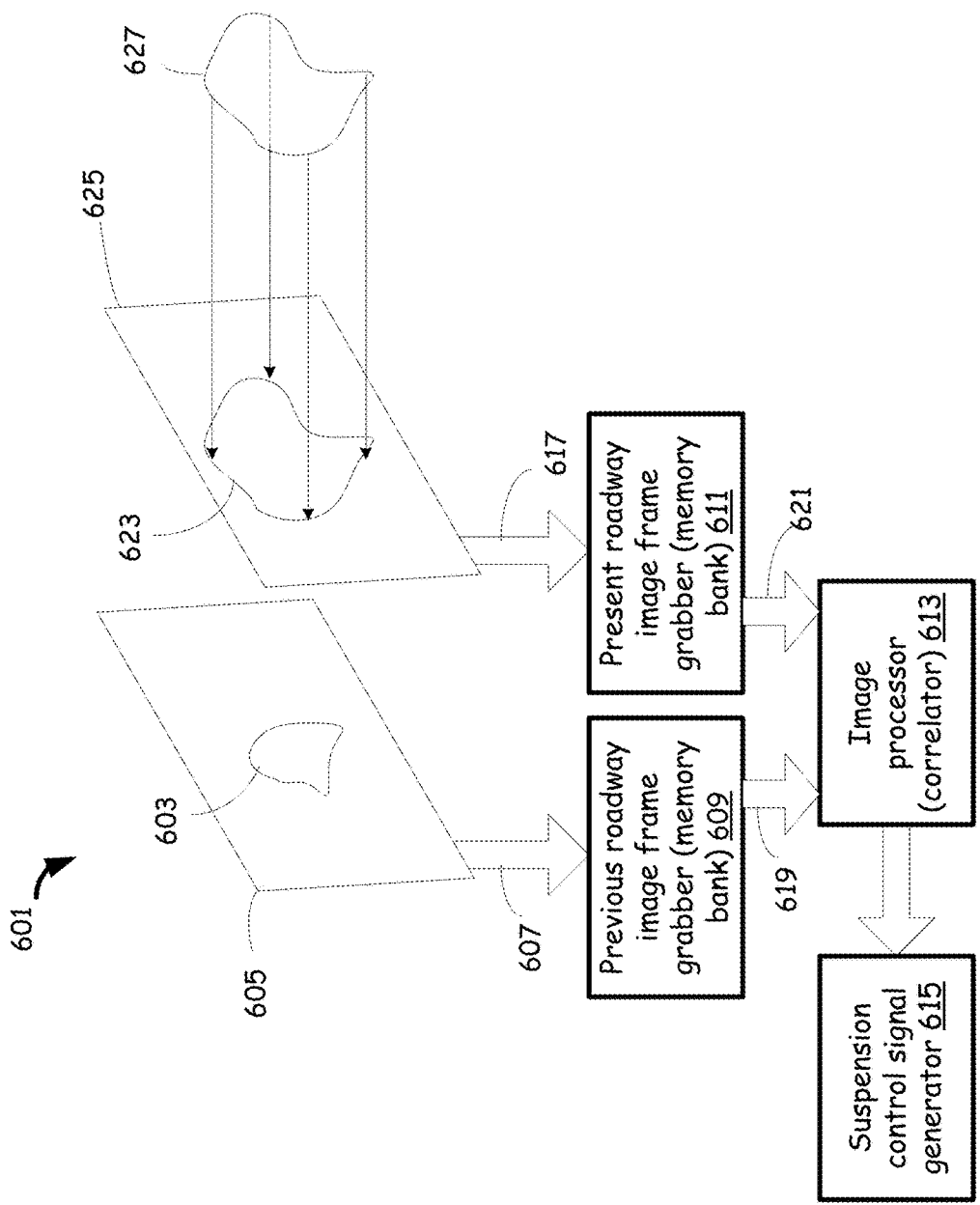
FIG. 6 is a diagram illustrating a processing of collecting and processing roadway images for understanding of the complete roadway characteristics for subsequent decision making in adjusting suspension system control, cruise control, and indications provided to the driver according to aspects of the present invention.

FIG. 6 is a diagram illustrating a processing of collecting and processing roadway images for understanding of the complete roadway characteristics for subsequent decision making in adjusting suspension system control, cruise control, and indications provided to the driver according to aspects of the present invention. In one embodiment 601, according to the present invention, a plurality digital cameras mounted on different part of the vehicle chassis as discussed in FIG. 5 sends snap shots of successive image frames of the roadway characteristics into an image processor. The current and the previous frames are correlated; on significant difference between these two frames, leads to the decision of change in the roadway characteristics, to conclude either as a pothole or a bump of a particular shape and size. Detection of larger obstacles, moving or stationary can also be done in a similar manner.

In an embodiment according to the present invention, 625 is the image of the roadway comprising image 623 of a defect 627. The information related to the image is stored as a variation in intensity and the color of the pixels on the camera which is stored in a memory bank 611 through a data bus 621. A previous detected roadway image frame 605, with defect image 603 is residing in a memory bank 609, transferred on a data bus 607 from the same camera.

In an embodiment according to the present invention, the present and previous frames are compared for the difference proportional to an incremental change in the roadway characteristics. The previous frame is residing in the memory bank 609 and the current frame in the memory bank 611. Both images are compared in the image processor and a decision is made, whether the vehicle is likely to approach the defect 627 within a short period of time estimated based on the velocity of the vehicle.

In an embodiment according to the present invention, the image processor executes an internal algorithm to decide whether the change in the sensed roadway characteristics corresponds to a pothole or a bump. Based on the decision made a Suspension Control signal generator 615 generates the necessary signal to actuate the Hydraulic pump 303 of FIG. 3 to adjust the pressure of the fluid in the vehicle suspension, in a correct direction to mitigate the effect of the roadway defect 627.

Figure 7:
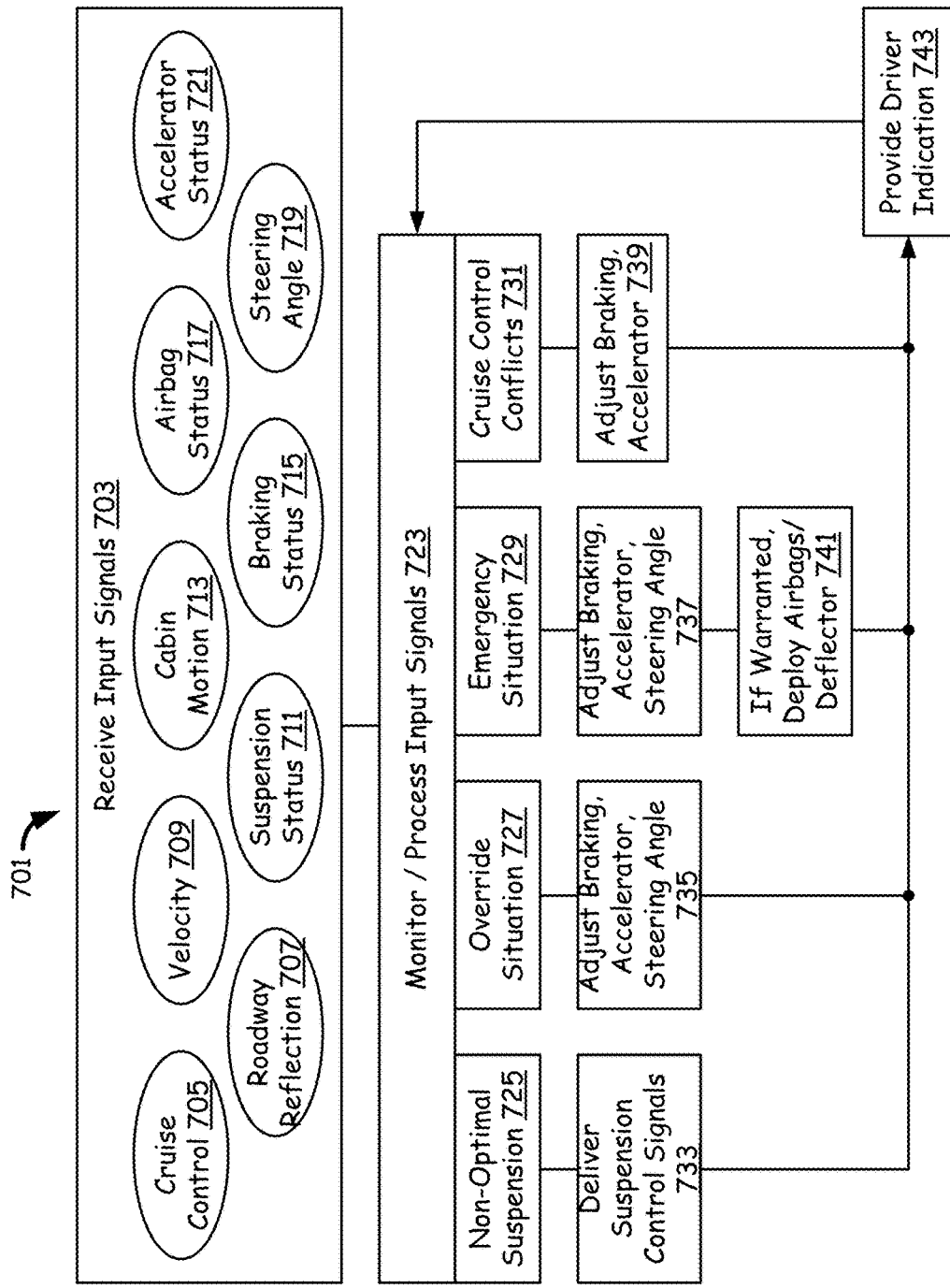
FIG. 7 is a diagram illustrating various quantities that are measured and converted to respective electrical input signal and provided to a process and control unit for processing to produce control signals for actuating control mechanisms of an active suspension control system of the present invention.

FIG. 7 is a diagram illustrating various quantities that are measured and converted to respective electrical input signal and provided to a process and control unit for processing to produce control signals for actuating control mechanisms of an active suspension control system of the present invention. FIG. 7 provides an expanded view 701 of the Control processing unit 125 of the FIG. 1. This figure gives a complete picture of status monitoring and control status of a vehicle on a roadway. Several inputs that are measured or detected and the corresponding control signals generated are shown in more detail.

According to an embodiment of the present invention, Receive input signal 703, comprises Cruise control 705 sensing the vehicle cruise operation and provides the input to the Monitor/Process Input signals 723 for processing. The processing circuit does the processing of the information and generate control signal for a safe cruise of the vehicle.

According to an embodiment of the present invention, Receive input signal 703, comprises velocity detecting unit, Velocity 709 and provides the input to the Monitor/Process Input signals 723 for processing and control signal generation. The processing circuit does the processing of velocity information and generate control signal for bringing vehicle to a safe velocity limit.

According to an embodiment of the present invention, Receive input signal 703, further comprise a suspension status sensing apparatus Suspension Status 711. The measure of the fluid pressure in the controllable suspension device is the input to the Monitor/Process Input signals 723 for processing and controlling of the suspension for the current roadway condition.

According to an embodiment of the present invention, Receive input signal 703, does comprise a cabin motion sensing apparatus, Cabin Motion 713 for sensing the cabin jerking or oscillatory motions happening at the defective roadway and roadway curvatures spots. An output from the Cabin Motion 713 goes to Monitor/Process Input signals 723 unit. In 723, processing of the signal takes place and suspension control signal is generated to mitigate the undesirable cabin motion.

According to an embodiment of the present invention, Receive input signal 703, does comprise a brake status sensing apparatus, Brake Status 715 for sensing the braking condition of the vehicle during the motions of the vehicle on the roadway. An output from 715 goes to Monitor/Process Input signals 723 unit. In 723, processing of the signal takes place and a braking override signal will be generated, if required, based on the current brake situation and the roadway conditions.

According to an embodiment of the present invention, Receive input signal 703, does comprise an airbag status sensing apparatus, Airbag Status 717 for sensing the current status of the airbag during reasonably heavy impact situations. An output from the 717 goes to Monitor/Process Input signals 723 unit. In 723, processing of the signal takes place and an airbag trigger signal is issued, if the airbag is not triggered already, otherwise will not (and maintain the current airbag status).

According to an embodiment of the present invention, Receive input signal 703, does comprise a steering angle sensing apparatus, Steering Angle 719 for sensing the current steering angle. An output from the 719 goes to Monitor/Process Input signals 723 unit. In 723, processing of the signal takes place and a steering guidance will be initiated if needed, in roadway curvature spots.

According to an embodiment of the present invention, Receive input signal 703, does comprise an acceleration sensing apparatus, Accelerator Status 721 for measuring the acceleration of the vehicle under the current roadway conditions. An output from the 721 goes to Monitor/Process Input signals 723 unit. In 723, processing of the signal takes place and an acceleration control or override signal is generated, proportional to roadway conditions.

According to an embodiment of the present invention, based on the input from 703, the process control circuitry 723 initiates control action by generating the control signal and sending them to the respective devices through their interfaces.

According to an embodiment of the present invention, based on the roadway characteristics, one of the output from the Process Input Signal 723, goes to a circuit, Non-optimal suspension 725, whose power level is inadequate to drive the Hydraulic pump. A power gate circuit controlled by 725 generates the required electric power. The power level at this stage is adequate to control a hydraulic pump, 303 of FIG. 3 for the controllable 313 (FIG. 3).

According to an embodiment of the present invention, based on the roadway characteristics, one of the output with a plurality of the signals from the block, Process Input Signal 723, goes to an override mechanism actuation control 727, labeled Override Situation; the required power level to actuate the mechanisms, onboard vehicle is boosted in a block 735, to cause to override Braking, Acceleration, and Steering Angle.

According to an embodiment of the present invention, one of the situation, based on the roadway conditions, one of the output signal from the block, Process Input Signal 723, goes to an emergency control mechanism 729, labeled Emergency Situation, causing to override the control for Braking, Acceleration and steering angle in 737, if warranted airbags are triggered in 741 for the safety of the persons inside the vehicle.

According to an embodiment of the present invention, one of the output signals from the block, Process Input Signal 723, goes to a circuit 731 implemented to provide an interface with the cruise control mechanism, depending on the road conditions, such in a hostile terrain. In an embodiment of the present invention, this is achieved by monitoring the roadway features at an accurate and rapid surveillance at a speed greater than human perceptibility. When driver fails to react quickly for changing conditions of the roadway with the fast movement of the vehicle, Cruise Control 731, override driver and adjusts braking acceleration etc., in 739. In of the automatic; control, adjustments, and also the roadway conditions are also brought to the notice of the driver on an audio/visual indication to him on a panel labeled, Provide Driver Indication 743.

Figure 8:
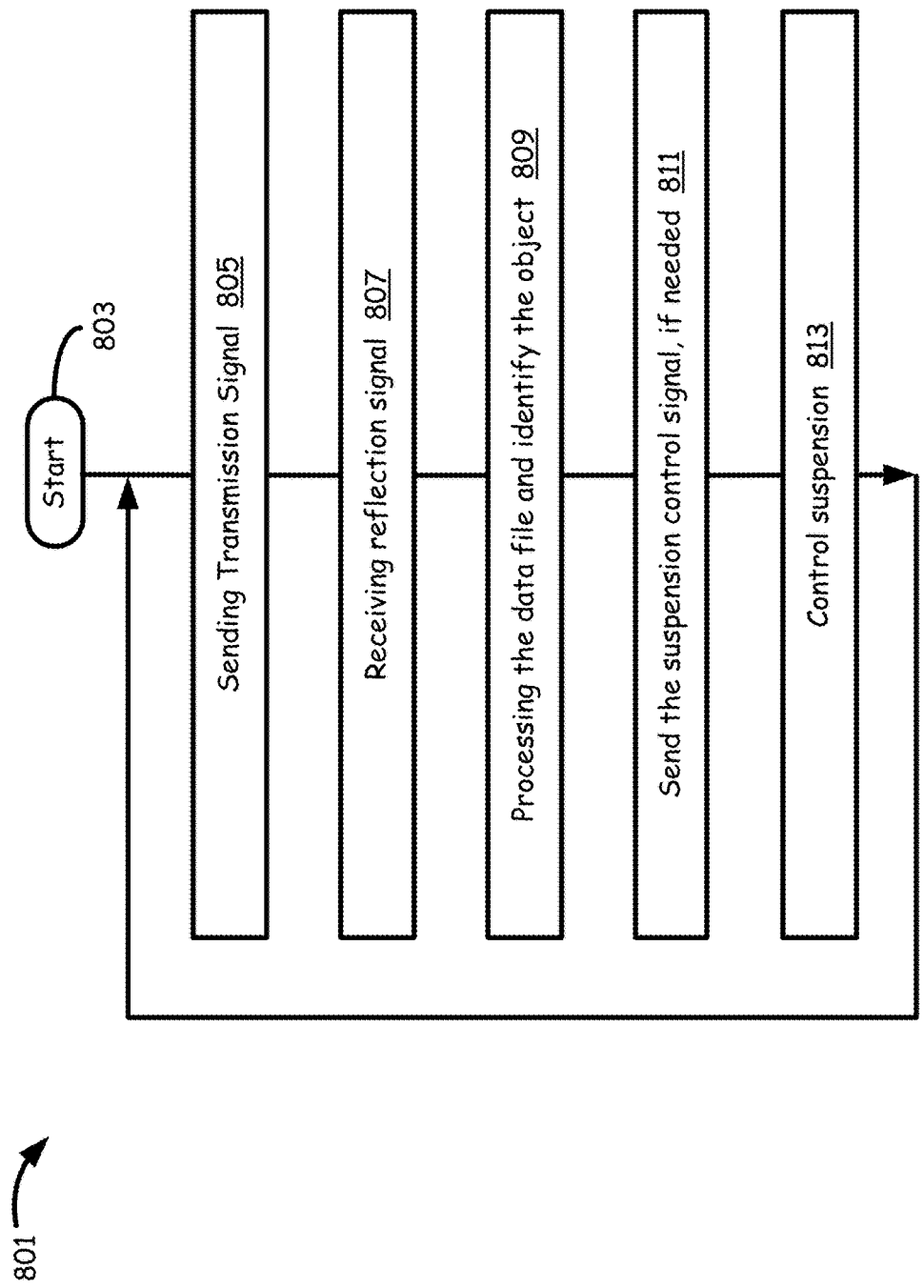
FIG. 8 is a flowchart illustrating operations that are performed with implementation of a look ahead suspension system in accordance with the present invention.

FIG. 8 is a flowchart illustrating operations that are performed with implementation of a look ahead suspension system in accordance with the present invention. The operations 801 of FIG. 8 take place during the look ahead suspension control operation as described earlier in FIG. 1 to FIG. 3, according to an embodiment of the present invention. A similar flowchart can explain the automatic control of the other vehicle parameters such as velocity, acceleration, steering angle, braking position, etc., during its motion along the roadway.

In an embodiment according to the present invention, when the ignition is put on at Start 803, all the processing and the control modules are powered up. When the vehicle is stationary, the detectors that are mounted on the chassis starts sensing the roadway; defects and obstacles, but the suspension control action is initiated only when the vehicle accelerates. The acceleration parameter value is essential for the processing circuitry to predict or extrapolate the time at which the wheels come in contact the roadway defects, at which point of time the fluid pressure in the suspension should be synchronously adjusted to a proper value depending on the depth or height of the roadway defect.

The control loop enters the state 805 from state 803, where the transmitter in the form an array of LEDs, as shown in the FIG. 4, transmits signal towards the roadway at an angle determined by the reflector, during a time slot determined by the scanning duration of all the detectors in a sequence, as described in FIG. 5.

The controller, from state 805, enters the state 807 where it receives the reflected electromagnetic signal from the roadway characteristics and transforms into electrical form and sends this electrical signal into the processing circuitry to enter the state 809.

Controller, in the state 809, processes the electrical signal, and generates the control signal to enter state 811. The controller, in state 813 sends the necessary control signal to drive the hydraulic pump for adjusting the fluid pressure in the cylinder of the suspension to mitigate the effect of the jerks due to the roadway defects. This operation repeats by entering back to the state 805.

Figure 9:
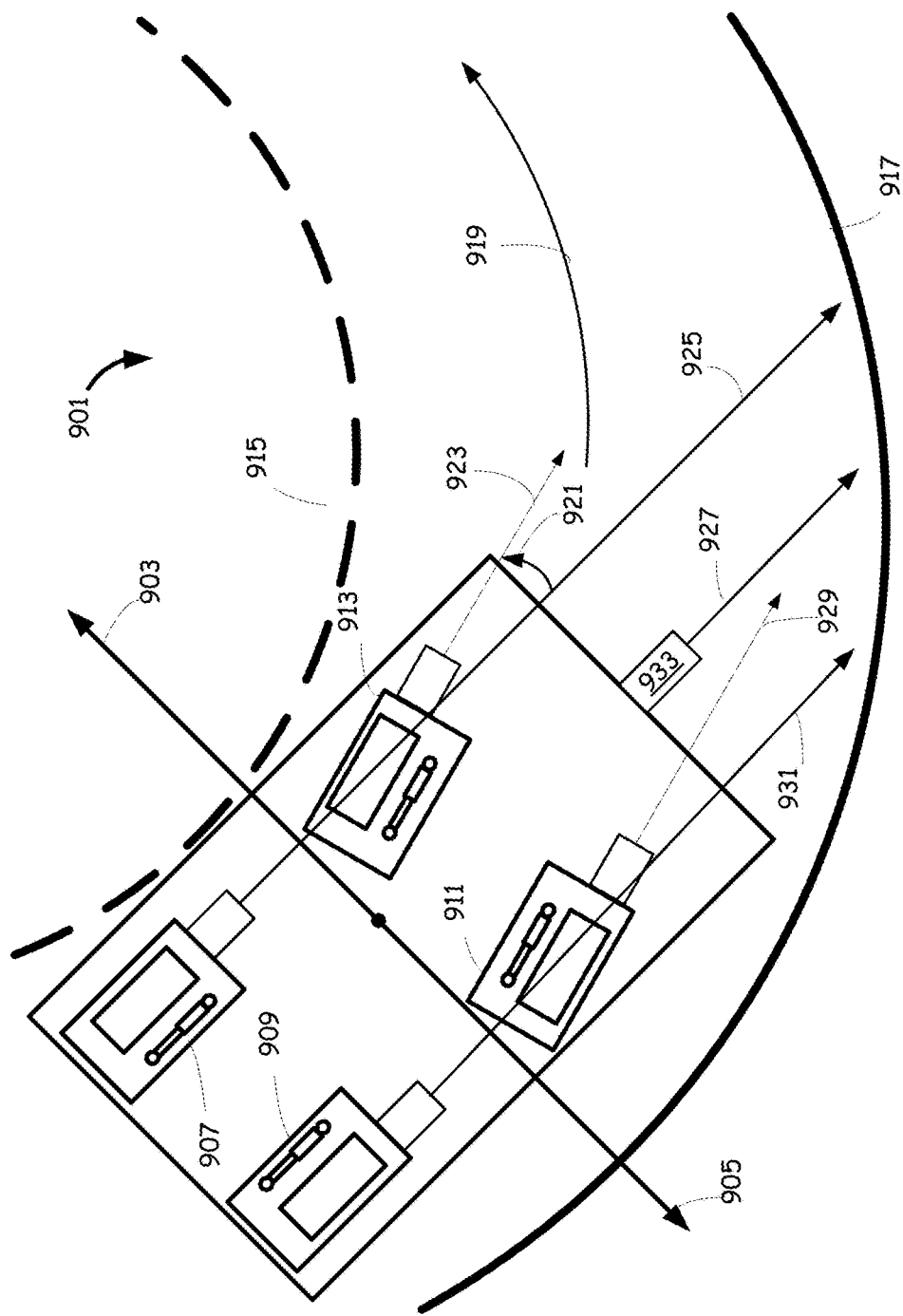
FIG. 9 is a diagram illustrating detection of roadway curvature by sensors that sense a roadway border and indicate a measured steering angle along with various forces that are acting on the moving vehicle to keep the vehicle in equilibrium in the radial direction according to aspects of the present invention.

FIG. 9 is a diagram illustrating detection of roadway curvature by sensors that sense a roadway border and indicate a measured steering angle along with various forces that are acting on the moving vehicle to keep the vehicle in equilibrium in the radial direction according to aspects of the present invention. The roadway characteristics sensed at such curvature are the roadway border and the tilt; the discontinuity point which has different signal reflection characteristic from that of the straight road. Another parameter at such spot is the radial drag on the tangentially moving vehicle.

According to an embodiment of the present invention, the roadway curvature 919, radially inward force 903 and outward force 905 and the roadway tilt are natural characteristics of a curvature that are detected for controlling the motion of the vehicle at such spots, along with the suspension control operation.

According to an embodiment of the present invention, the detectors on rear tire and front tire assembly 907, 909, 911, and 913 are placed exactly in front of the wheel, so that they can detect the roadway defects more accurately. A detector such as 933 placed close in front of the vehicle chassis for the detection of the roadway obstacles can view the left roadway border 915 and the right roadway border 917, more accurately.

In an embodiment according to the present invention; the steering angle 921, a measure of the roadway curvature for displaying on the driver's panel and also for the cruise control purpose at such roadway curvature spots, can be measured based on the angle between an emitted ray beam 923 and a ray beam 925 of signals from the detector assembly. This information is used to know on various force parameters that are acting on the vehicle during its passage at such curvature spots. The calculation of such forces helps to control the acceleration of the vehicle at such spots for avoiding the dangers of skidding of the vehicle off the roadway or for avoiding hitting with a vehicle in the neighboring lane.

In an embodiment according to the present invention; all the roadway curvature parameters are detected and measured and send to the process and control circuitry discussed in 125 of FIG. 1 and 205 of FIG. 2 which makes decision and issue control signal for, adjusting the onboard devices and display them on the driver's panel and if warranted to actuate the override mechanism for safe cruise of the vehicle.

Figure 10:
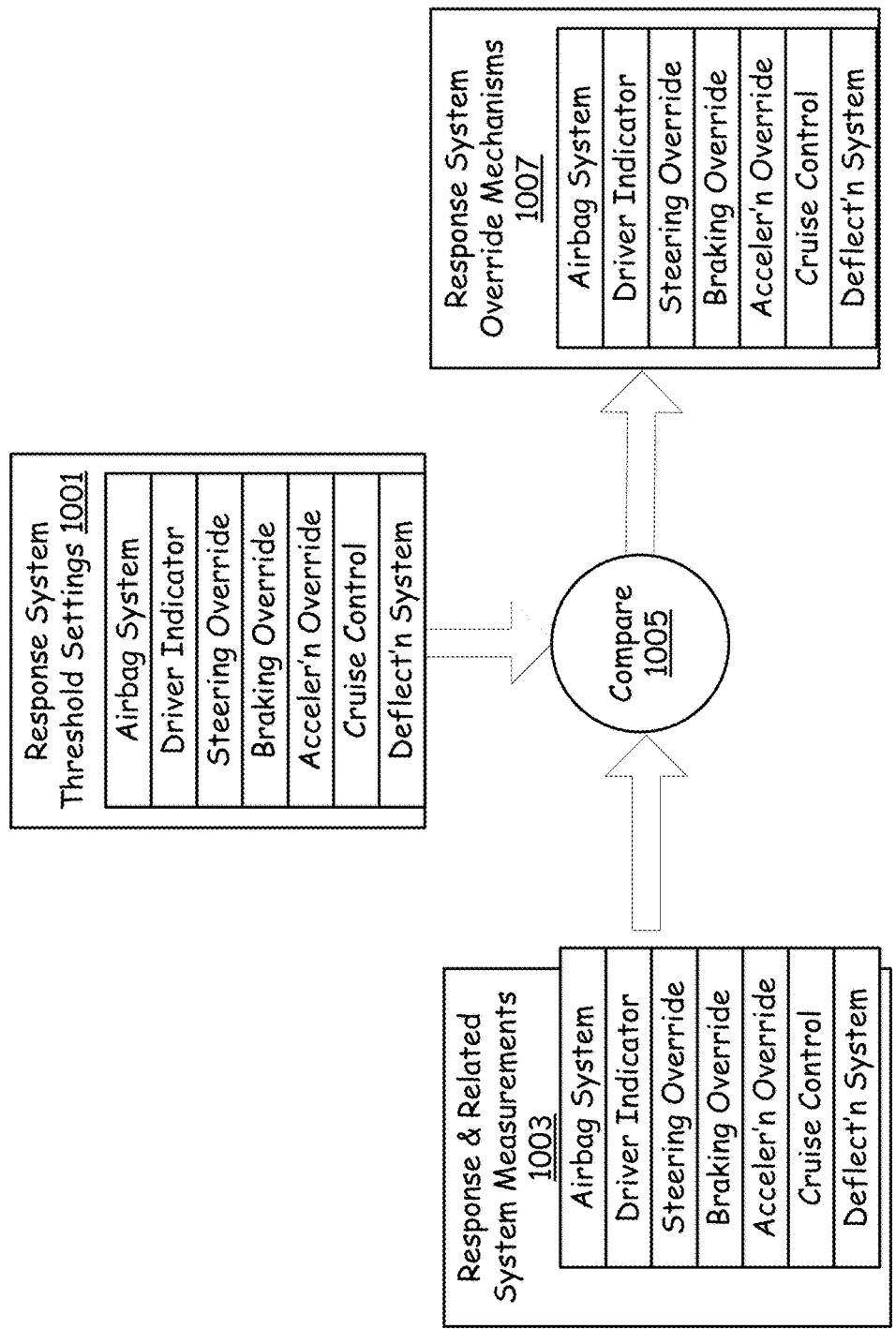
FIG. 10 is a block diagram illustrating a vehicle control override mechanism that operates based upon detected and manual threshold adjustments of variables under consideration in accordance with an embodiment of the present invention.

FIG. 10 is a block diagram illustrating a vehicle control override mechanism that operates based upon detected and manual threshold adjustments of variables under consideration in accordance with an embodiment of the present invention. This mechanism ensures the safety of the vehicle when driver fails to act in time. The detectors mounted on the vehicle chassis, always monitor the roadway conditions and the current response status of the vehicle, under motion. Whenever, any parameter under monitor exceeds a preset value, the override mechanism acts, along with the necessary indication to the driver on his panel.

In an embodiment according to the present invention, a plurality of the response parameters and vehicle system measurements parameters, 1003 under consideration are Airbag system, Driver indicator, Steering override, Braking override, Acceleration override, Cruise control, and Deflection control. These parameters are constantly sensed and measured by the respective sensors and the related electronic system and stored the inbuilt latches and memories.

In an embodiment according to the present invention, a plurality of the response parameters and vehicle system measurements parameters, 1001 under consideration and mentioned earlier viz., are Airbag system, Driver indicator, Steering override, Braking override, Acceleration override, Cruise control, and Deflection control, needs a threshold to set for each of these parameters, above or below which an action of override take place, implying the failure of the driver to act quickly and in time.

In an embodiment according to the present invention, the sensed Responses and system measurements 1003 and the corresponding manual set threshold values are compared in a comparator 1005, each one of them with a separate comparison with their respective threshold values, producing a difference with associated sign, viz., plus or minus during comparison. Depending on the sign of comparison results, a decision making circuit acts to triggers override action and also does update of the quantity measured at the present instant of time on a display.

In an embodiment according to the present invention, the status of the airbag is sensed when an airbag needs to deployed. If it is already in a deployed state, the trigger mechanism simply does not to do anything. The quantity that needs to be set as threshold is the impact level. In the case of Driver indicator, it is the selection of variables to indicate on the panel and their constant update is the one, which needs to be manually set. Steering override, Braking override, Acceleration override, are associated with a set threshold above or below which, the override mechanism acts to override the driver actions.

As one of average skill in the art will appreciate the present disclosure as one of the new and an elegant method over the prior art of the vehicle suspension control. Although there is some way of looking at the roadway defects and the control of the suspension, one can appreciate the superiority of method and the goal that is achieved as for the present invention, Simplicity, robustness and compactness of the transceiver architecture is far more elegant and appreciable. The goal that can be achieved is far more a feasible technique with more comfort, safety and luxury accomplished, than ever before. As one of average skill in the art will also appreciate, inferred implementation and method to a vast number of other applications, such as velocity sensing, acceleration sensing, cruise control, override mechanism, etc., using same method discussed herewith, in the context of the look ahead suspension implementation.

Although a system and method according to the present invention has been described in connection with the preferred embodiment, it is not intended to be limited to the specific form set forth herein, but on the contrary, it is intended to cover such alternative, modifications, and equivalents, as can be reasonably included within the spirit and scope of the invention as defined by this disclosure and appended diagrams The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An active suspension system comprising:
a first adjustable suspension device;
a second adjustable suspension device;
at least one transmitter, mounted on a vehicle, configured to send source signals toward a roadway;
a plurality of sensors mounted on the vehicle, a first of the plurality of sensors disposed to service at least a front tire upon which the vehicle travels, a second of the plurality of sensors disposed to service at least a rear tire upon which the vehicle travels, the first of the plurality of sensors configured to receive reflection signals from the roadway that at least in part originate from the at least one transmitter;
processing circuitry, communicatively coupled to the plurality of sensors, that is configured to identify at least one roadway characteristic based on interactions with the plurality of sensors; and the processing circuitry is further configured to respond to the identification of the at least one roadway characteristic by interacting with the first adjustable suspension device before a single front tire encounters the at least one roadway characteristic and with a second adjustable suspension before a single rear tire encounters the at least one roadway characteristic.

2. The active suspension system of claim 1, wherein the processing circuitry is further configured to respond to the identification of the at least one roadway characteristic by invoking a driving override function in an attempt to avoid the roadway characteristic.

3. The active suspension system of claim 1, wherein the processing circuitry is further configured to respond to the identification of the at least one roadway characteristic by invoking a safety system to prepare for an encounter with the roadway characteristic.

4. A motor vehicle used on a roadway, the motor vehicle having at least a front tire and a rear tire, the motor vehicle comprising:
   processing circuitry;
   a first adjustable suspension assembly associated with the front tire;
   a second adjustable suspension assembly associated with a rear tire, the first adjustable suspension assembly and the second adjustable suspension assembly being independently adjustable in response to signals from the processing circuitry;
   a front reflection sensor disposed to collect first information about a first portion of the roadway, the first portion of the roadway being located in front of the front tire;
   a rear reflection sensor disposed to collect second information about a second portion of the roadway, the second portion of the roadway being located in front of the rear tire and behind the front tire;
   the processing circuitry being configured to receive and analyze both the first information and the second information to identify a roadway characteristic; and
   the processing circuitry is further configured to respond to the identification of the roadway characteristic by:
      determining whether and when to direct a first adjustment of the first adjustable suspension assembly and a second adjustment of the second adjustable suspension assembly, the second adjustment being coordinated with and independent of the first adjustment in an attempt to accommodate the roadway characteristic; and
      determining whether to invoke a driving override function in an attempt to avoid the roadway characteristic.

5. The motor vehicle of claim 4, wherein the driving override function comprises actuating a braking mechanism.

6. The motor vehicle of claim 4, wherein the driving override function comprises actuating an acceleration mechanism.

7. The motor vehicle of claim 4, wherein the driving override function comprises actuating a steering mechanism.

8. The motor vehicle of claim 4, wherein the processing circuitry being configured to consider motion related data in making at least one of the determinations.

9. The motor vehicle of claim 4, wherein the front reflection sensor comprises an imager.

10. The motor vehicle of claim 9, wherein imager generates the first information based on image frames and the processing circuitry analyzes the first information by comparing image frames.

11. A motor vehicle used on a roadway, the motor vehicle having at least a front tire and a rear tire, the motor vehicle comprising:
    processing circuitry;
    a first adjustable suspension assembly associated with the front tire;
    a second adjustable suspension assembly associated with a rear tire, the first adjustable suspension assembly and the second adjustable suspension assembly being independently adjustable in response to signals from the processing circuitry;
    a front reflection sensor disposed to collect first information about a first portion of the roadway, the first portion of the roadway being located in front of the front tire;
    the processing circuitry being configured to receive and analyze the first information to identify a roadway characteristic; and
    the processing circuitry being further configured to respond to the identification of the roadway characteristic by:
       determining whether and when to direct a first adjustment of the first adjustable suspension assembly and a second adjustment of the second adjustable suspension assembly, the second adjustment being coordinated with and independent of the first adjustment in an attempt to accommodate the roadway characteristic;
       determining whether to invoke an automatic driving function in an attempt to avoid the roadway characteristic; and
       determining whether to invoke a safety system to prepare for an encounter with the roadway characteristic.

12. The motor vehicle of claim 11, wherein the safety system comprises an airbag system.

13. The motor vehicle of claim 11, wherein the safety system comprises a deflection system.

14. The motor vehicle of claim 11, further comprising:
    a rear sensor disposed to collect second information about a second portion of the roadway; and
    processing circuitry being configured to also use the second information in the identification of the roadway characteristic.

15. The motor vehicle of claim 14, wherein the safety system comprises an airbag system.

16. The motor vehicle of claim 11, wherein the processing circuitry also being configured to evaluate motion data in making at least one of the determinations.

17. The motor vehicle of claim 11, wherein the front reflection sensor comprises an imager.

18. The motor vehicle of claim 17, wherein imager generates the first information based on image frames and the processing circuitry analyzes the first information by comparing image frames.

19. The motor vehicle of claim 11, wherein the processing circuitry also being configured to evaluate a steering angle in making at least one of the determinations.

20. The motor vehicle of claim 14, further comprising an electromagnetic transmitter that assists the front reflection sensor.

* * * * *